(12) United States Patent
Higuchi et al.

(10) Patent No.: US 7,983,447 B2
(45) Date of Patent: Jul. 19, 2011

(54) IMAGING ENVIRONMENT RECOGNITION DEVICE

(75) Inventors: Mirai Higuchi, Hitachi (JP); Soichiro Yokota, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 1179 days.

(21) Appl. No.: 11/710,542

(22) Filed: Feb. 26, 2007

(65) Prior Publication Data
US 2007/0263902 A1 Nov. 15, 2007

(30) Foreign Application Priority Data

Feb. 27, 2006 (JP) ................................. 2006-049482

(51) Int. Cl.
*G06K 9/00* (2006.01)
(52) U.S. Cl. ......... 382/103; 382/255; 382/203; 348/345
(58) Field of Classification Search .................. 382/104, 382/128, 100, 107, 203, 255; 348/148, 345; 359/462, 407; 701/36
See application file for complete search history.

(56) References Cited

U.S. PATENT DOCUMENTS

| | | | | |
|---|---|---|---|---|
| 7,423,752 | B2 * | 9/2008 | Leleve et al. ................... | 356/338 |
| 7,599,521 | B2 * | 10/2009 | Watanabe et al. .............. | 382/104 |
| 7,620,237 | B2 * | 11/2009 | Nagaoka et al. ............... | 382/154 |
| 7,693,629 | B2 * | 4/2010 | Kawasaki ........................ | 701/36 |
| 2006/0082879 | A1 * | 4/2006 | Miyoshi et al. ................ | 359/462 |
| 2006/0233425 | A1 * | 10/2006 | Kobayashi et al. ............ | 382/106 |
| 2007/0263902 | A1 * | 11/2007 | Higuchi et al. ................ | 382/104 |
| 2009/0135253 | A1 * | 5/2009 | Augst ............................. | 348/148 |

FOREIGN PATENT DOCUMENTS

| | | | |
|---|---|---|---|
| EP | 1 498 721 | A1 | 1/2005 |
| JP | 11-326541 | A | 11/1999 |
| JP | 2000-355260 | A | 12/2000 |
| JP | 2005-162168 | A | 6/2005 |
| WO | WO 01/77763 | A1 | 10/2001 |

OTHER PUBLICATIONS

European Search Report dated Jul. 23, 2010 (seven (7) pages).

* cited by examiner

*Primary Examiner* — Daniel G Mariam
*Assistant Examiner* — Nancy Bitar
(74) *Attorney, Agent, or Firm* — Crowell & Moring LLP

(57) ABSTRACT

An imaging environment that greatly affects image recognition accuracy is recognized for applications in onboard systems of various sorts including imaging devices.

An imaging device for imaging areas around the vehicle is mounted on a vehicle. Before executing image recognition processing, information is acquired on objects and texture, such as traffic signs and pedestrian crossings, present within a field of view of the imaging device. An object or texture present within the field of view is then recognized by an image recognition section. Degrees of distortion and defocus of a shape or texture of the object recognized are calculated based on the shape or texture of the object recognized and information previously acquired on the objects or texture. Imaging environment, such as water droplets or dirt on a lens, and whether fog occurs or not, is then recognized based on the degrees of distortion and defocus calculated from the shape or texture of the object recognized.

11 Claims, 13 Drawing Sheets

FIG. 4
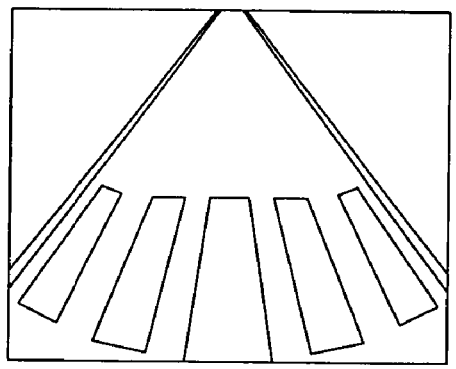
IMAGE TAKEN
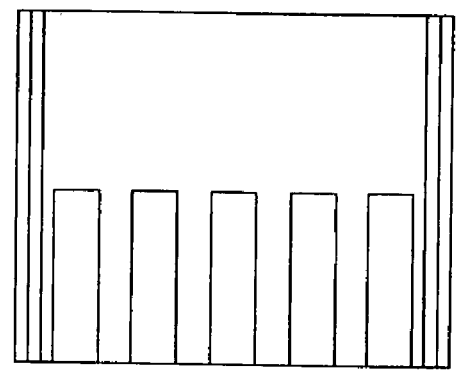
OVERHEAD VIEW

FIG.5A  FIG.5B  FIG.5C
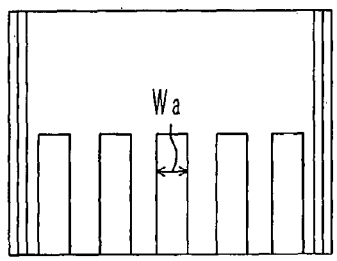
IDEAL WHITE
LINE EDGE
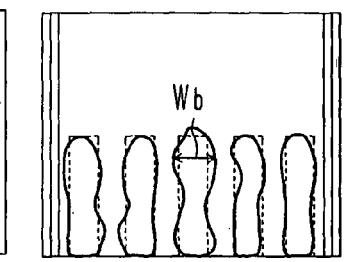
WATER DROPLETS OR DIRT
SPREAD GENERALLY OVER
THE ENTIRE LENS SURFACE
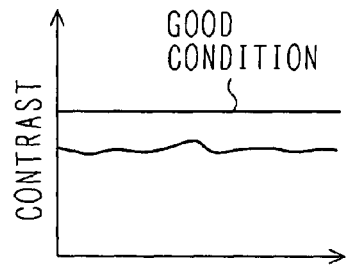
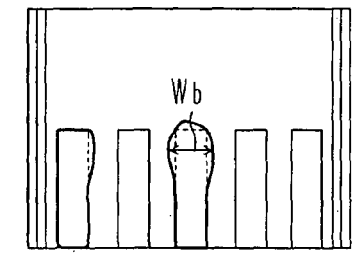
WATER DROPLETS OR DIRT
DEPOSITED LOCALLY ON THE
LENS SURFACE
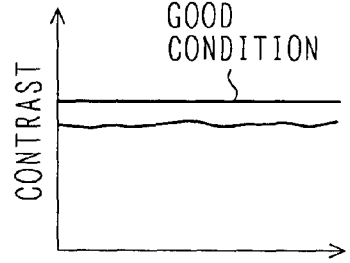
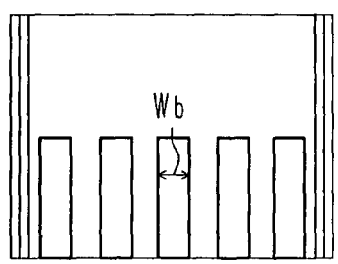
FOG OCCURRING
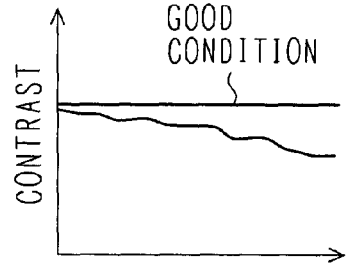

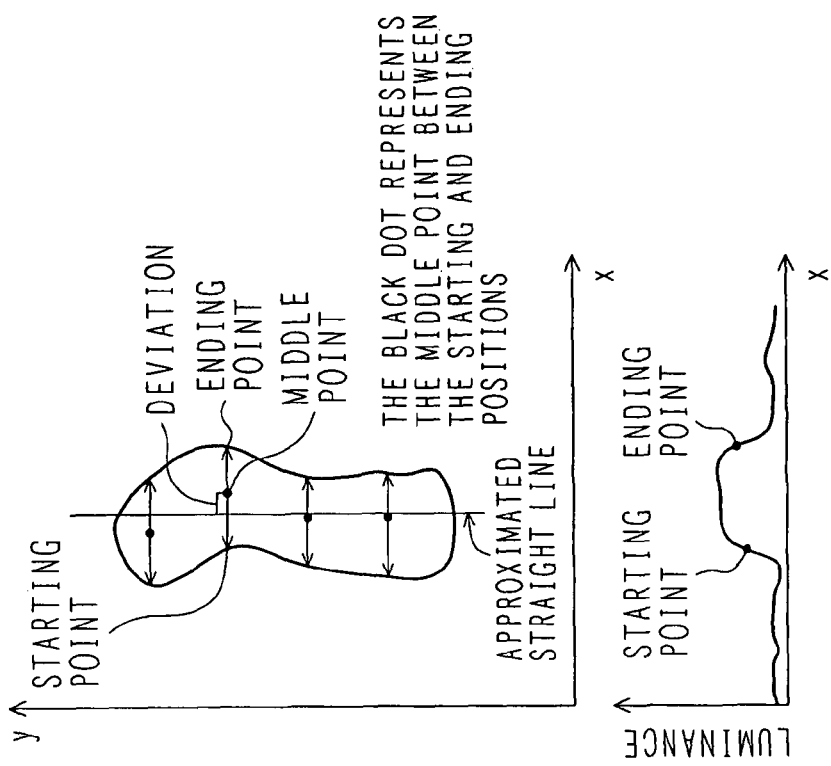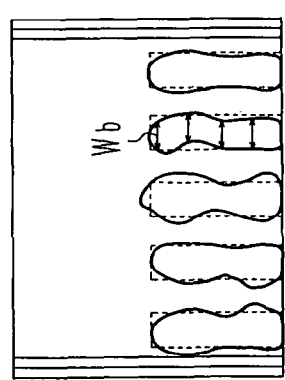

FIG. 7

| | MEAN OF DEGREE OF DEFOCUS | VARIANCE OF DEGREE OF DEFOCUS | DEVIATION OF MIDDLE POINT OF WHITE LINE | VARIATIONS IN CONTRAST |
|---|---|---|---|---|
| GOOD VISIBILITY | SMALL | SMALL | SMALL | SMALL |
| WATER DROPLETS OR DIRT SPREAD GENERALLY OVER THE ENTIRE LENS SURFACE | DON'T CARE | LARGE | LARGE | SMALL TO MEDIAM |
| WATER DROPLETS OR DIRT DEPOSITED LOCALLY ON THE LENS SURFACE | SMALL TO MEDIAM | MEDIAM | MEDIAM | SMALL |
| FOG | SMALL TO MEDIAM | MEDIAM | SMALL TO MEDIAM | LARGE |

FIG.12
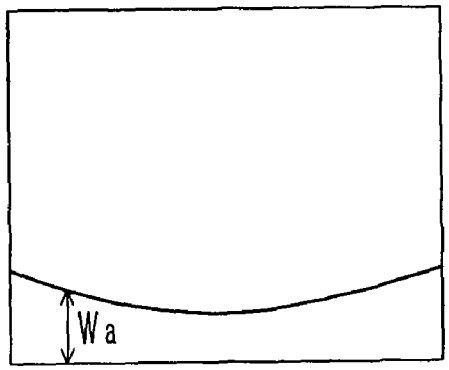
IDEAL EDGE OF
IMAGE TAKEN
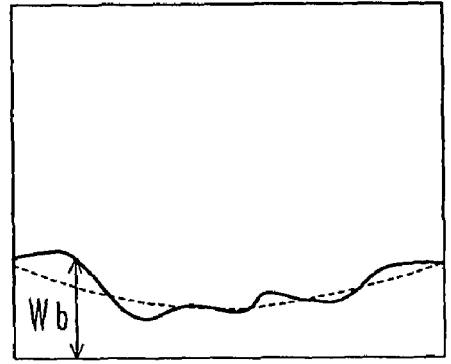
WATER DROPLETS OR DIRT
SPREAD GENERALLY OVER
THE ENTIRE LENS SURFACE
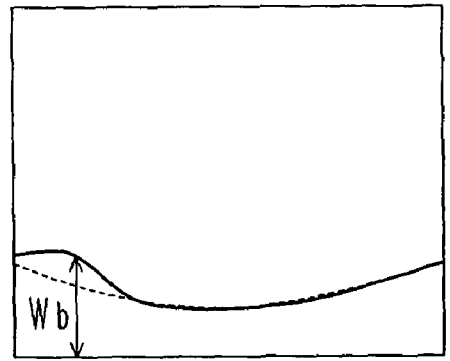
WATER DROPLETS OR DIRT
SPREAD GENERALLY OVER
THE ENTIRE LENS SURFACE

FIG.13

| | MEAN OF DEGREE OF DEFOCUS | VARIANCE OF DEGREE OF DEFOCUS |
|---|---|---|
| GOOD VISIBILITY | SMALL | SMALL |
| WATER DROPLETS OR DIRT SPREAD GENERALLY OVER THE ENTIRE LENS SURFACE | LARGE | MEDIUM TO LARGE |
| WATER DROPLETS OR DIRT DEPOSITED LOCALLY ON THE LENS SURFACE | MEDIAM | MEDIAM |

IMAGING ENVIRONMENT RECOGNITION DEVICE

BACKGROUND OF THE INVENTION

1. Field of the Invention

The present invention relates to an imaging environment recognition device that provides a vehicle onboard system using an onboard camera, such as an obstacle detection system or a parking support system, with necessary environmental information by using an imaging means, such as a camera, for imaging road conditions surrounding the vehicle and processing the image taken to recognize imaging environment.

2. Description of the Related Art

Research and development activities have been underway for recent years to provide automatic driving of vehicles and vehicle driving aid. Techniques have being studied for notifying drivers of the presence of a pedestrian by processing images taken by an onboard camera for detecting pedestrians. Techniques are also being studied for providing driving aid by detecting obstacles, traffic lights, and traffic signs.

When images are taken by such an onboard camera, fog may occur, or a lens of the onboard camera mounted on an outside of the vehicle or a window disposed forward of the onboard camera mounted on an interior of the vehicle may be covered with water droplets from rain. The fog or water droplets can make the images taken by the onboard camera less sharp, thus hampering proper detection of obstacles and traffic signs. It therefore becomes important to warn the driver of the imaging environment by recognizing water droplets and the like present within a field of view of the camera because of rainfall and to improve quality of the images by removing the water droplets and the like.

Conventionally known is a technique that detects contamination of a window glass or rainfall to achieve the foregoing purposes, as disclosed in JP-A-11-326541. According to the known art, a traffic lane is detected in order to detect contamination of a window glass forward of an onboard camera or rainfall. A degree of defocus of the traffic lane is thereby obtained. The degree of defocus obtained is then compared with that when the visibility is good. Contamination of the window glass or rainfall is thereby determined. In addition to the technique detecting contamination of the window glass forward of the camera and the like, a technique is known for detecting water droplets deposited on the lens of a camera mounted on the outside of the vehicle. Such a technique is disclosed in JP-A-2000-355260. The technique calculates an optical flow of an image taken by the onboard camera and determines that an object containing therein water is deposited if a velocity vector suddenly appears in a region close to the camera in the calculated optical flow.

SUMMARY OF THE INVENTION

The known art as disclosed in JP-A-11-326541, however, entails the following problems. Specifically, if an image is distorted as an image taken in an environment in which water droplets are directly deposited on the lens, a traffic lane is imaged with a distorted outline instead of the image of the traffic lane being defocused. As a result, the degree of defocus does not allow the water droplets deposited on the lens to be detected. Further, if the image is largely distorted or severely defocused, it becomes difficult to detect the traffic lane itself. Another problem is that, if the type of traffic lane and faint paint or other paint conditions are not identified, the degree of defocus may be wrongly calculated or incorrectly compared. The known art as disclosed in JP-A-2000-355260 on the other hand involves the following problem. Specifically, if transparent water droplets are deposited on the lens, calculated optical flow develops over an entire image taken as in the case, in which there are no water droplets deposited on the lens, disabling detection of transparent water droplets on the lens.

The present invention provides a vehicular image recognition device capable, in all systems incorporating an onboard camera for imaging the surroundings of a vehicle, of precisely detecting fog or rain, contamination or water droplets on the lens, or contamination, water droplets, or the like on the window glass forward of the onboard camera.

BRIEF DESCRIPTION OF THE DRAWINGS

FIG. 4 is a view showing a typical conversion of an image taken by an onboard camera 3, from a coordinate system on the image to a coordinate system in which the image is viewed straight from an upward direction of a road surface, in the onboard system according to the first embodiment of the present invention.

FIGS. 5A to 5C are diagrams illustrating mean of a degree of defocus calculated by a distortion/defocus degree calculation section, variance of the degree of defocus, and an amount of change in contrast.

FIGS. 6A and 6B are diagrams showing an overview of operations for calculating a degree of distortion of a white line performed by the distortion/defocus degree calculation section.

FIG. 7 is a diagram showing a relationship between values calculated by the distortion/defocus degree calculation section and imaging environment.

FIG. 12 is a view showing typical detection of a boundary between a bumper area and a road surface area made by a distortion/defocus degree calculation section in the onboard system according to the second embodiment of the present invention.

FIG. 13 is a diagram showing a relationship between values calculated by the distortion/defocus degree calculation section and imaging environment in the onboard system according to the second embodiment of the present invention.

DETAILED DESCRIPTION OF THE PREFERRED EMBODIMENTS

Specific embodiments to which the present invention is applied will be described below with reference to the accompanying drawings

First Embodiment

Figure 1:
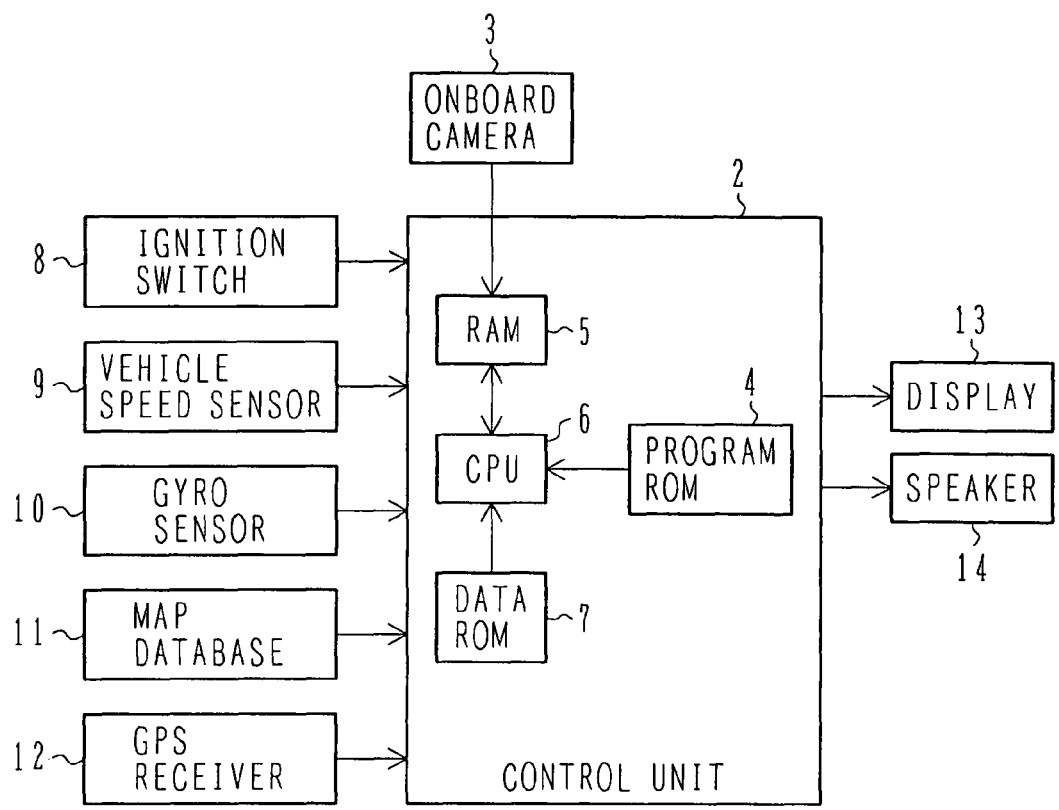
FIG. 1 is a block diagram showing a vehicle-mounted onboard system according to a first embodiment of the present invention.

FIG. 1 is a block diagram showing a vehicle-mounted onboard system incorporating an imaging environment recognition device according to an embodiment of the present invention. The imaging environment recognition device according to the embodiment of the present invention achieves the function of recognizing environment surrounding the vehicle using an onboard camera 3 included in the onboard system. The onboard system shown in FIG. 1 detects a position of the vehicle, in which the system is mounted (hereinafter referred to as "host vehicle"). The onboard system also presents information of various sorts concerning guiding of a traveling path and obstacles present forward of the host vehicle. The onboard system includes the onboard camera 3, a display 13, a speaker 14, and a control unit 2. The onboard camera 3, disposed on an outside of the host vehicle, takes images forward of the host vehicle. The display 13, disposed on an inside of the host vehicle, displays images and information of various types. The speaker 14 produces an alarm sound when dirt or water droplets are on a lens of the onboard camera 3. The control unit 2 controls display of the display 13 and operations of the entire onboard system.

Typically, the onboard camera 3 is disposed at a leading end of the host vehicle on the outside thereof. The camera 3 is adapted to take an image forward of the host vehicle, as pointing down toward the ground at a predetermined depression angle and at a predetermined mounting position. The image of a forward direction of the host vehicle (hereinafter referred to as "forward image") taken by the onboard camera 3 is supplied to the control unit 2 and stored in RAM 5. The control unit 2 performs image processing of the image stored in the RAM 5. When determining that there is a danger of collision based on the recognition of an obstacle forward of the host vehicle, the control unit 2 uses the display 13 and the speaker 14 to warn a driver of the impending danger.

Typically, the display 13 includes an LCD (liquid crystal display) or similar display device. The display 13 is controlled by the control unit 2 to display images of various kinds, including images for guiding the traveling path (traveling path guidance images) and images for monitoring the forward view (front view monitor image), using a navigation system. When the control unit 2 recognizes an imaging environment, such as fog, or water droplets or the like on the lens of the onboard camera 3, a message informing the fact that the imaging environment is not good is displayed on the display 13. In addition, if there is a possibility that an obstacle detection system is not properly operated, the control unit 2 displays the fact on the display 13. Further, when the control unit 2 recognizes that the imaging environment is not good, the control unit 2 included in the onboard system drives the speaker 14 to give an alarm sound.

The control unit 2 includes a CPU 6, the RAM 5, data ROM 7, program ROM 4, and the like connected via a bus. The control unit 2 controls the operation of the entire onboard system by letting the CPU 6 execute various control programs stored in the program ROM 4. The RAM 5 retains forward image data that represents images taken by the onboard camera 3 and subjected to A-to-D conversion. The RAM 5 thus functions as an image memory. In addition, the program ROM 4 stores an obstacle detection program, an imaging environment recognition program, and a navigation program. Specifically, the obstacle detection program recognizes a preceding vehicle and the like forward of the host vehicle. The imaging environment recognition program recognizes fog, and water droplets, dirt, or the like on the lens. The CPU 6 loads these programs from the program ROM 4 and executes each of the programs at predetermined time intervals in a time-sharing manner. Navigation functions, the imaging environment recognition function for the camera, and the obstacle detection function are thereby achieved.

A vehicle speed sensor 9, a gyro sensor 10, and a GPS (global positioning system) receiver 12 are connected to the control unit 2. Further, various information stored in a map database 11 is read by a DVD (digital versatile disc) drive or other data reproduction device and supplied to the control unit 2. During normal operation of the onboard system, the CPU 6 executes the navigation program and displays on the display 13 the traveling path guidance image that represents a current position of the host vehicle or a path or the like searched according to operating inputs made by an occupant, superimposed on a map image supplied from the map database 11.

Figure 2:
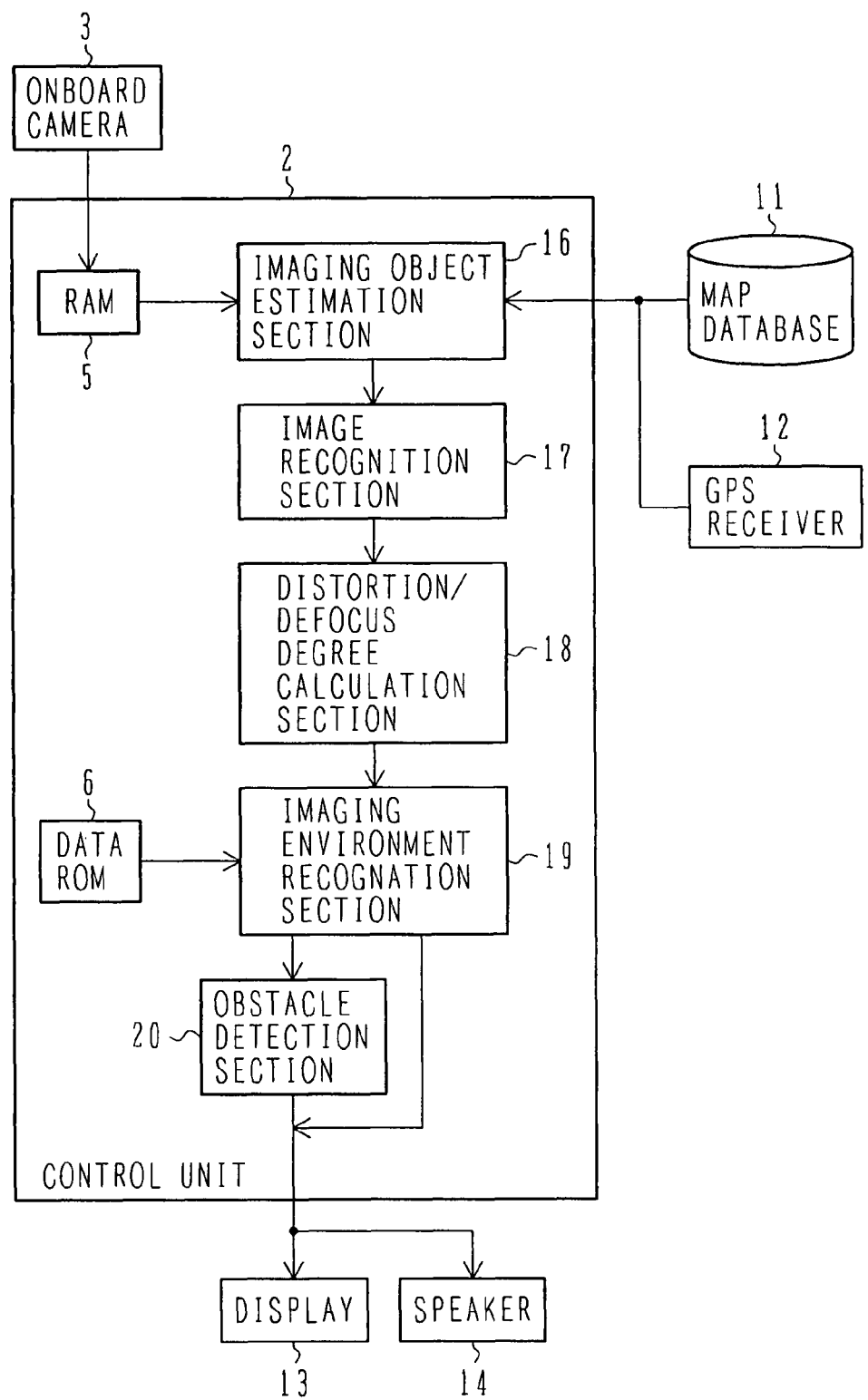
FIG. 2 is a functional block diagram of a control unit achieved when an imaging environment recognition program and an obstacle detection program are executed in the onboard system according to the first embodiment of the present invention.

An ignition signal from an ignition switch 8 is supplied to the control unit 2. The ignition signal is turned on when an engine of the host vehicle is started. When the ignition signal is turned on, the CPU 6 executes the imaging environment recognition program and the obstacle detection program. The control unit 2 then functions as an imaging object estimation section 16, an image recognition section 17, a distortion/defocus degree calculation section 18, an imaging environment recognition section 19, and an obstacle detection section 20 as shown in a functional block diagram of FIG. 2.

The imaging object estimation section 16 uses a GPS signal from the GPS receiver 12 to identify the position of the host vehicle. The imaging object estimation section 16 further uses signals from the vehicle speed sensor 9 and the gyro sensor 10 to determine a speed and a traveling direction of the host vehicle. Based on the position, speed, and the traveling direction of the host vehicle, the imaging object estimation section 16 obtains information on a pedestrian crossing and other road markings (hereinafter referred to as "features") present forward of the host vehicle from the map database 11. For the features, the map database 11 stores the types of features, the position of the features, and road links, which are associated with each other. The types of the features allow information on the sizes and shapes of the features to be obtained by referring to feature specifications information stored in the data ROM 7. The feature information may include condition information that tells, for example, the degree of faintness.

The image recognition section 17 performs image recognition of the forward image covering the features present within the field of view of the onboard camera 3 as obtained by the imaging object estimation section 16. Before executing the image recognition processing, the imaging object estimation section 16 is used to extract the features that can be present within the field of view of the camera. Information is then obtained on the features extracted, including the types, conditions of faintness, and sizes of the features. Information on the object of interest to be recognized through image processing can thereby be obtained in advance. Features can therefore be accurately recognized even under imaging environment, in which water droplets are on the lens.

The distortion/defocus degree calculation section 18 calculates, for each of the features recognized by the image recognition section 17, distortion of the shape and texture and the degree of defocus of the outline and texture, based on the image corresponding to the feature in question.

The imaging environment recognition section 19 recognizes the imaging environment from the degree of distortion and defocus obtained by the distortion/defocus degree calculation section 18, based on the information on the type, condition, size, and the like of each of the features present within the field of view of the onboard camera 3 obtained by the imaging object estimation section 16.

The onboard system including the elements as described above normally displays the traveling path guidance image on the display 13 through the navigation program executed by the CPU 6 of the control unit 2. The CPU 6 of the control unit 2 concurrently executes the obstacle detection program and the imaging environment recognition program. If an obstacle is detected through the obstacle detection program or water droplets or the like on the lens are detected through the imaging environment recognition program, a message informing a fact to that effect is superimposed on the guidance image displayed on the display 13.

Sharpness of the image taken by the onboard camera 3 changes as the imaging environment is deteriorated as a result of water droplets on the lens of the onboard camera 3 or fog or the like. The change in the sharpness of the image may result in such problems as an image recognition processing failure to recognize the object of interest or faulty recognition. The following arrangements are therefore made in the onboard system to which the present invention is applied. Specifically, when the ignition signal applied from the ignition switch 8 is turned on, the CPU 6 of the control unit 2 executes the imaging environment recognition program and the obstacle detection program. During an execution time allotted at regular intervals for the imaging environment recognition program, a specific type of environment, in which the onboard camera 3 takes images, is evaluated by detecting occurrence of fog or deposition of water droplets or dirt on the lens of the onboard camera 3. If occurrence of fog or deposition of water droplets or dirt on the lens of the onboard camera 3 is detected, parameters for the obstacle detection program are changed so that obstacles can be properly detected under the imaging environment recognized. If the imaging environment is further deteriorated and it is determined that detection of obstacles is impossible, the system is shut down to prevent an erratic operation thereof. A message to that effect is then displayed on the display 13, while an alarm sound is produced from the speaker 14 to warn the occupant of the vehicle.

Figure 3:
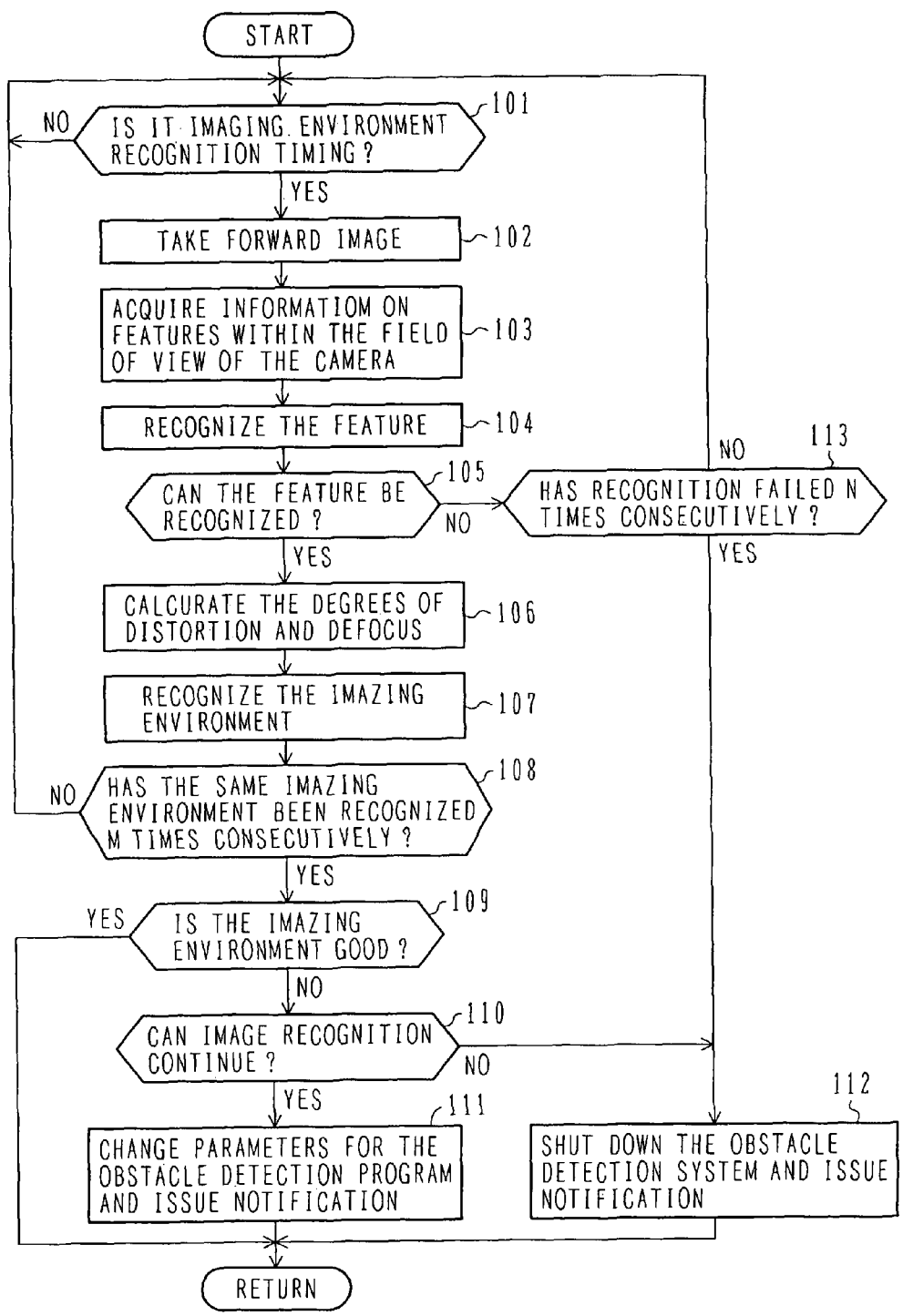
FIG. 3 is a flowchart showing operations performed by an imaging environment recognition section in the onboard system according to the first embodiment of the present invention.

Flow of a series of processing steps performed by the control unit 2 for recognizing the imaging environment of the onboard camera 3 in the onboard system as described heretofore will be described with reference to a flowchart shown in FIG. 3. The series of processing steps shown in FIG. 3 are executed by the imaging environment recognition program that is started when the ignition switch 8 is turned on and repeatedly started until the ignition switch 8 is turned off. The series of processing steps are executed regardless of whether the host vehicle is running or stationary, and whether the image displayed on the display 13 is the traveling path guidance image or one shown by the obstacle detection system.

When the ignition signal applied from the ignition switch 8 is turned on, the control unit 2 executes the imaging environment recognition program and the navigation program. Processing of the flowchart of the imaging environment recognition program shown in FIG. 3 is then started. In the navigation program that is run concurrently, information on the features present forward of the host vehicle is obtained from the map database 11. It is then determined whether it is previously determined imaging environment recognition timing or not based on the information on the features forward of the host vehicle (step 101). When the imaging environment recognition timing arrives, an actual image forward of the host vehicle is taken by the onboard camera 3 and is captured and retained in the RAM 5 (step 102).

The imaging object estimation section 16 then estimates, based on the information on the features forward of the host vehicle obtained by the navigation program and the specifications information on the features stored in the data ROM 7, specific types of features present within the field of view of the onboard camera 3 (step 103). More specifically, the navigation program is run to calculate the traveling direction of the host vehicle based on the current position of the host vehicle obtained from the GPS receiver 12 and signals from the vehicle speed sensor 9 and the gyro sensor 10. The information on the features present in a predetermined range forward of the host vehicle is then obtained from the map database 11 and stored in the RAM 5. The imaging object estimation section 16 reads that data and, based on the data read, determines the types of the features. The specifications information on the features is next obtained from the data ROM 7, so that estimation is made on specific types of the features and specific locations of the features or the distances ahead from the host vehicle.

The image recognition section 17 extracts specific pixels from among those that represent the actual image taken by the onboard camera 3. The specific pixels are those, in which a difference in pixel value from adjacent pixels exceeds a predetermined value. If the actual image is monochrome, pixels whose brightness changes largely are identified from among those that make up the actual image. It is then determined whether or not a shape pattern formed from the specific pixels identified complies with characteristics of the feature estimated by the imaging object estimation section 16. The estimated feature is thereby recognized (step 104). More specifically, if the estimated feature is a pedestrian crossing, the system recognizes the feature as the pedestrian crossing as detailed below. A width of a white line of the pedestrian crossing present forward of the host vehicle is estimated from the information on faintness and the like of the paint of the pedestrian crossing to be recognized as obtained from the map database 11 by the navigation program and the information on the specifications of the pedestrian crossing, including the width of the white line, as obtained from the data ROM 7 by the navigation program. An absolute value of the difference between a starting position and an ending position of the while line detected from the image is divided by the width of the white line. If the calculated value falls within a predetermined threshold, a score is added to recognize the pedestrian crossing.

It is to be noted that, while data stored in the map database 11 and the data ROM 7 is a two-dimensional pattern drawn on a road surface, the data obtained from the onboard camera 3 is an image taken by the onboard camera 3 pointing downward obliquely. The two types of data cannot be simply compared. Coordinate transformation is therefore performed on the shape pattern of the feature obtained through the image taken by the onboard camera 3, so that the image data obtained from the onboard camera 3 is transformed into a shape pattern as viewed straight from an upward direction in the same format as that stored in the map database 11 or the data ROM 7, and the comparison is performed. The coordinate transformation is accomplished through perspective transformation using information on the height from the road surface and the depression angle of the onboard camera 3. Specifically, the coordinate system is transformed into one, in which the object of interest is viewed straight from the upward direction of the road surface as shown in FIG. 4. If the score obtained in step 104 is equal to or more than the threshold value, the pedestrian crossing is considered to be recognized. If the score is not equal to or more than the threshold value until it is determined that the host vehicle has passed through the pedestrian crossing based on the position information, the pedestrian crossing is not considered to be recognized (step 105).

Figure 8:
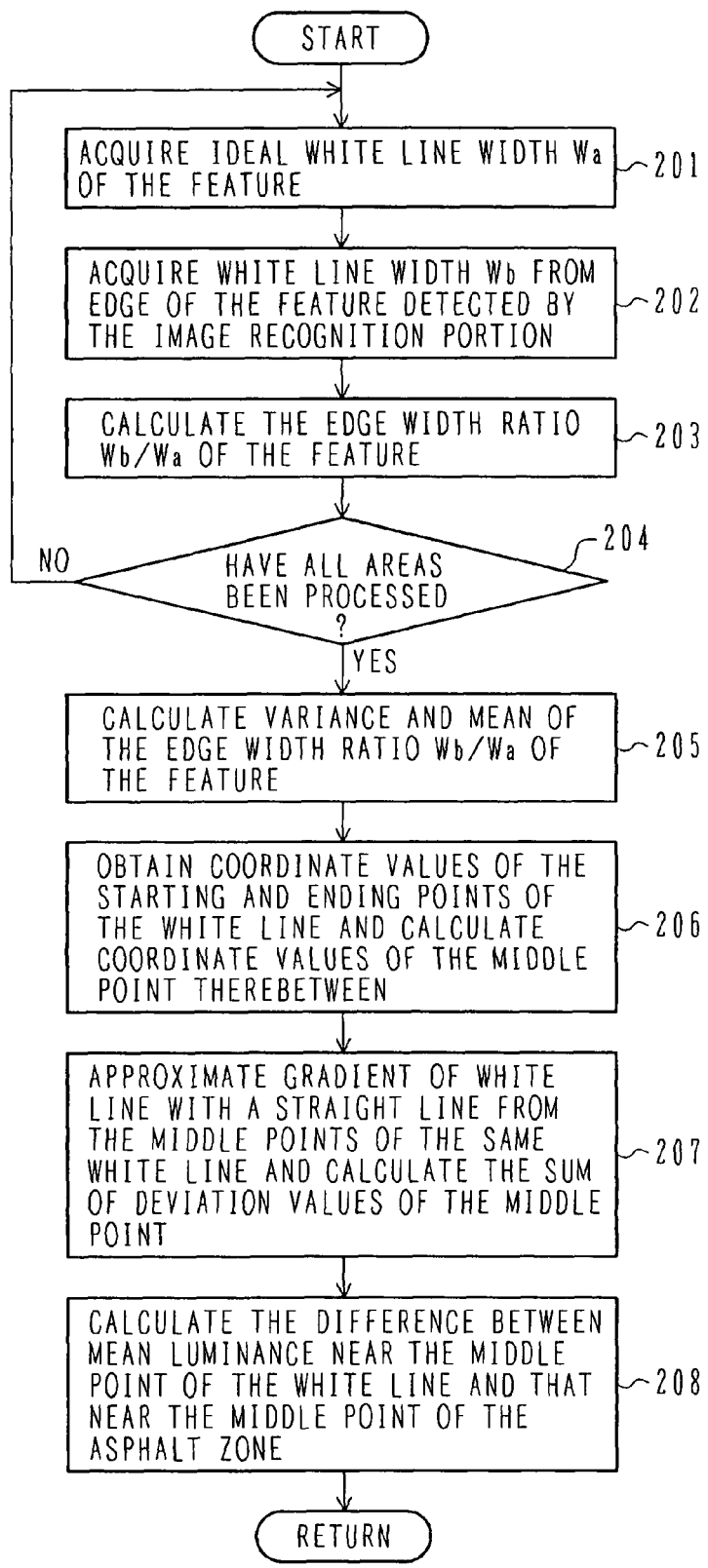
FIG. 8 is a flowchart showing operations performed by the distortion/defocus degree calculation section.

If the feature has been recognized, the distortion/defocus degree calculation section 18 calculates distortion and the degree of defocus based on the width of the white line detected by the image recognition section 17 and that estimated by the imaging object estimation section 16 (step 106). The defocus of the image is defined as a degree of the image in which the difference in the pixel value between adjacent pixels is smaller than a value actually observed, due to fog or the like. Distortion means a phenomenon, in which water droplets or the like on the lens cause an incident light on the lens to be refracted, making the image actually taken by the camera different from what is supposed to be taken. FIG. 8 is a flowchart for calculating the distortion and the degree of defocus.

Referring first to FIG. 5A, a white line width Wa is calculated for an ideal image of the pedestrian crossing estimated based on the information on the type, size, conditions, and the like of the feature obtained by the imaging object estimation section 16 (step 201). Referring to FIG. 5B, a white line width Wb is obtained based on coordinate values of a starting point and an ending point of the white line detected from the image taken by the camera (step 202). A white line width ratio Wb/Wa of the feature to be recognized is then calculated from the ideal white line width Wa estimated by the imaging object estimation section 16 and the white line width Wb calculated from the image taken by the camera (step 203). The white line width ratio Wb/Wa is calculated for the entire white line detection area (step 204). The white line width ratio is expected to fall substantially within a predetermined range. If the width ratio is large, therefore, it means that a boundary of the white line recognized from the image taken by the camera is blurry. Accordingly, a mean value of these ratios is defined as the degree of defocus. If variance of these values of the degree of defocus is large, it indicates that the white line width recognized from the image taken by the camera varies at a number of locations. The variance of variations in the degree of defocus is therefore calculated as a degree of distortion (step 205).

FIG. 6B is an enlarged view showing a part shown in FIG. 6A that shows an image taken when the lens is generally deposited with water droplets and dirt. Referring to FIG. 6B, a rise of luminance is defined as a starting point edge of the white line and a fall of luminance is defined as an ending point edge of the white line. Coordinate values of a middle point are then obtained from coordinate values of the starting and ending point edges of the white line. For the entire white line detection area, coordinate values of the middle point between edges are calculated (step 206). The coordinate values of these middle points are then statistically processed, so that gradient of each white line is approximated by a straight line. A sum of values representing deviation between the approximated straight lines and the middle points is calculated to be defined as a second degree of distortion (step 207). Further, a difference between a mean value of luminance of pixels at an area near the middle point of the white line and that of luminance of pixels at an area near the middle point of an asphalt zone (hereinafter referred to as "contrast") is obtained as a second degree of defocus (step 208).

Using the degree of distortion and defocus obtained through the steps described above, the fog and deposition of water droplets or dirt on the lens are identified (step 107). For example, referring to FIG. 5C, if fog occurs, the contrast varies greatly toward extreme ends of the image. That is, the contrast becomes larger toward a lower portion of the image and smaller toward an upper portion of the image. The symbol "d" in FIG. 5C represents a distance between the camera and the object being imaged. The greater the value of d, the smaller the contrast, due to the fog. Specifically, the contrast is greater toward the lower portion of the image and smaller toward the upper portion of the image. For the water droplets or dirt deposited on the entire surface of the lens, variance of the degree of defocus and deviation of the middle points of the white line become greater. FIG. 7 shows the degrees of defocus and distortion under different types of imaging environment.

When visibility is good, all the degrees remain small because there is no defocus and distortion throughout the entire image. When water droplets or dirt spread all over, distortion causes the white line width to vary widely. As a result, the mean value of the degree of defocus varies greatly, making the variance of the degree of defocus large. At the same time, distortion affects such that the deviation of the middle point of the white line become great. When the water droplets or dirt are deposited locally, the variance of the degree of defocus and the deviation of the middle point of the white line fall on substantially intermediate values between those when the visibility is good and those when the water droplets or dirt spread all over. With the foggy environment, the object to be imaged at a farther distance from the camera yields a greater degree of defocus with a lower contrast of luminance between the white line and asphalt. Specifically, the degree of defocus becomes greater and the contrast becomes lower toward the upper portion of the image.

Only if results of the imaging environments recognized in step 107 are the same a predetermined number of times or more, it is determined that the imaging environment has been recognized and the operation proceeds to step 109. Otherwise, the operation returns to step 101 again (step 108).

If, in step 105, the image recognition section 17 fails to recognize the feature estimated by the imaging object estimation section 16, it is checked to see if the feature has not been recognized consecutively for a predetermined number of times. If it is found that the feature has not been recognized consecutively for the predetermined number of times, the imaging environment recognition section 19 determines that it is difficult to perform image recognition in the current imaging environment and the operation proceeds to step 112. Otherwise, the operation returns to step 101 (step 113).

If it is found that, as a result of recognition of the imaging environment performed in step 107, the visibility is good, it is determined that the imaging environment is good because of no problems evident in the imaging environment. If it is found that the visibility is not good, the operation proceeds to the following step (step 109).

If the imaging environment recognition section 19 determines, for example, that water droplets are on the lens of the onboard camera 3, it is determined whether or not image recognition can continue by determining whether or not the degree of distortion and defocus falls within a predetermined threshold value (step 110). If it is determined that the degree of distortion and defocus is smaller than the predetermined threshold value and the image recognition can continue, the result of imaging environment recognition performed in step

107 is transmitted to the obstacle detection section 20, so that various parameters of the obstacle detection program are changed to those corresponding to the result of imaging environment recognition, including those applicable to a case, in which water droplets are deposited on the lens. At the same time, the control unit 2 lets the display 13 show a message to that effect (step 111).

If it is determined that the degree of distortion and defocus is greater than the predetermined threshold value and the image recognition cannot continue, the control unit 2 drives the speaker 14 to produce the alarm sound. The occupant of the vehicle is thereby notified that the imaging environment for the onboard camera 3 may be not good and the obstacle detection system may not operate properly. The obstacle detection program is then temporarily suspended and waits until the imaging environment is recovered (step 112). The occupant of the vehicle can recognize, through this notification, that the obstacle detection system may not be fully operational and take appropriate action including, for example, intentionally turning off the obstacle detection system.

The onboard system, to which the present invention is applied, lets the control unit 2 repeatedly perform the series of operations as described above until the ignition switch 8 is turned off. The imaging environment recognition program, which starts at regular intervals, periodically determines as to whether or not the imaging environment for the onboard camera 3 is good.

As described heretofore, the onboard system, to which the present invention is applied, recognizes the imaging environment for the onboard camera 3 at regular intervals and transmits the result of recognition to the various systems using the onboard camera 3. The onboard system further notifies the occupant of the vehicle of the recognition result, so that the various systems using the onboard camera 3 change system operations or the like in accordance with the result of recognition of the imaging environment, while the occupant recovers the imaging environment by removing water droplets or dirt from the surface of the lens of the onboard camera 3, thereby allowing the systems to operate appropriately. If it is determined that it is difficult for the systems using the onboard camera 3 to continue operations, the systems are shut down. Or, the occupant of the vehicle shuts down the systems based on the information given by the control unit 2, so that the systems using the onboard camera 3 can prevent an erroneous operation.

Second Embodiment

A second embodiment of the present invention will be described below. For arrangements of the onboard system according to the second embodiment of the present invention, like parts as those used in the arrangements according to the first embodiment of the present invention are identified by like reference numerals and detailed descriptions for the same will be omitted.

Figure 9:
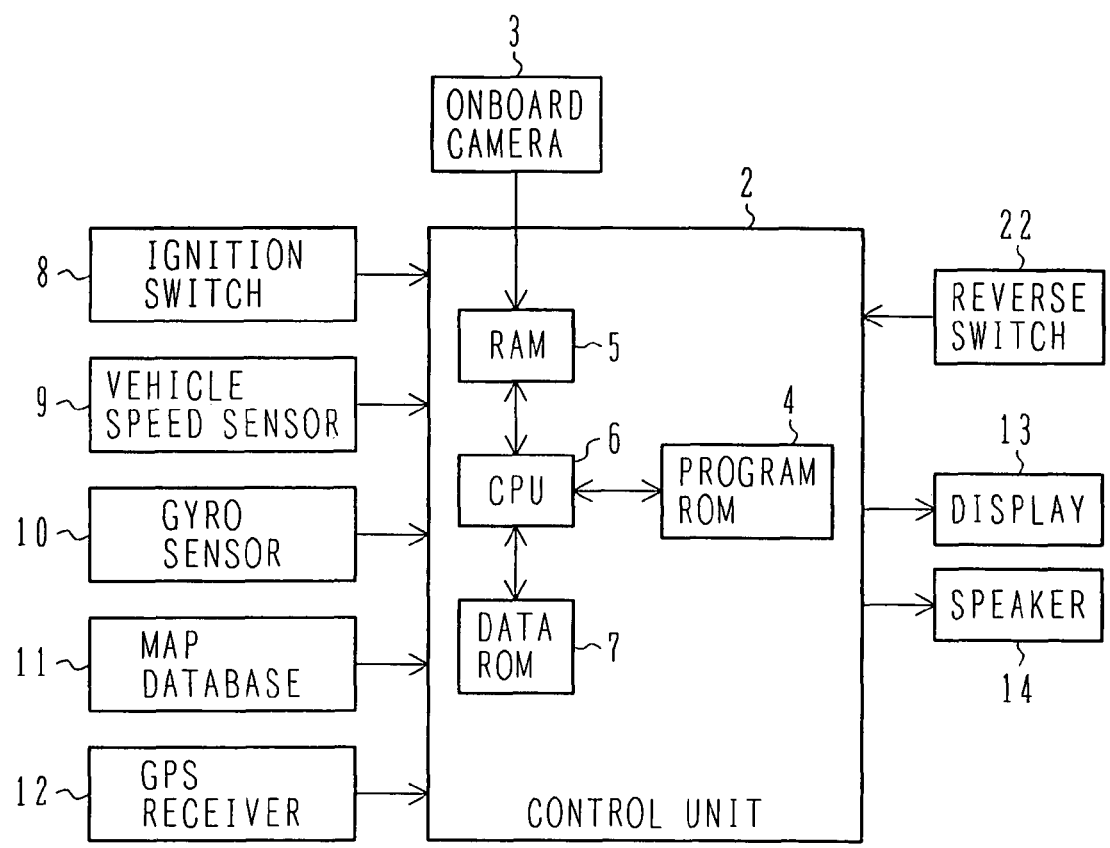
FIG. 9 is a block diagram showing an onboard system incorporating an imaging environment recognition device according to a second embodiment of the present invention.

FIG. 9 is a block diagram showing a vehicle-mounted onboard system according to the second embodiment of the present invention. An onboard camera 3 that achieves the function of recognizing the environment surrounding the vehicle in the onboard system according to the second embodiment of the present invention is disposed such that part of the vehicle falls within the field of view, as compared with the onboard camera 3, which is included in the onboard system according to the first embodiment of the present invention and which is disposed on the outside of the host vehicle at the leading end portion thereof. Assuming that the part of the vehicle is a rear bumper, the onboard camera 3 is disposed rearward and on the outside of the host vehicle, upward of the rear bumper. The onboard camera 3 is disposed so as to point down toward the ground at a predetermined depression angle and at a predetermined mounting position to view areas rearward of the host vehicle and such that the rear bumper falls within the field of view of the onboard camera 3. The onboard camera 3 thereby takes images including the rear bumper. As described above, the predetermined part of the vehicle is used as the object of image recognition. This achieves high recognition accuracy, as compared the case of using unspecified features. Thus, the recognition of the imaging environment can be performed more accurately.

The onboard system according to the second embodiment of the present invention includes a reverse switch 22 in addition to the parts included in the onboard system according to the first embodiment of the present invention. When the reverse switch 22 supplies a control unit 2 with a reverse on signal that is outputted when the vehicle is reversed, a CPU 6 of the control unit 2 executes a parking support program. The parking support program then displays a back view monitor image on a display 13. The back view monitor image includes a distance scale, obstacle detection results, and a detected parking space superimposed on an actual image showing a rearward view of the host vehicle imaged by the onboard camera 3.

When the control unit 2 determines that there is danger of collision with an obstacle or the like based on an image of an area rearward of the host vehicle taken by the onboard camera 3 (hereinafter referred to as "rearward image"), the control unit 2 uses the display 13 and a speaker 14 to warn a driver of the impending danger. The control unit 2 controls the display 13 that thereby displays a traveling path guidance image by navigation, a back view monitor image, and images of various other sorts. In addition, the control unit 2 also displays messages of various sorts on the display 13. These messages may notify that the imaging environment is not good as a result of recognition of imaging environment, in which fog occurs or water droplets or dirt are on a lens of the onboard camera 3 or give a warning that a parking support system may not be fully operational. Further, when the control unit 2 recognizes that the imaging environment is not good, the control unit 2 drives the speaker 14 to issue an audible alarm notification.

A program ROM 4 stores the parking support program, an imaging environment recognition program, and a navigation program. Specifically, the parking support program supports parking of the vehicle. The imaging environment recognition program recognizes fog that has occurred, or water droplets, dirt, or the like deposited on the lens. The CPU 6 loads these programs from the program ROM 4 and executes each of the programs. Parking support functions, the imaging environment recognition function for the camera, and navigation functions are thereby achieved.

Figure 10:
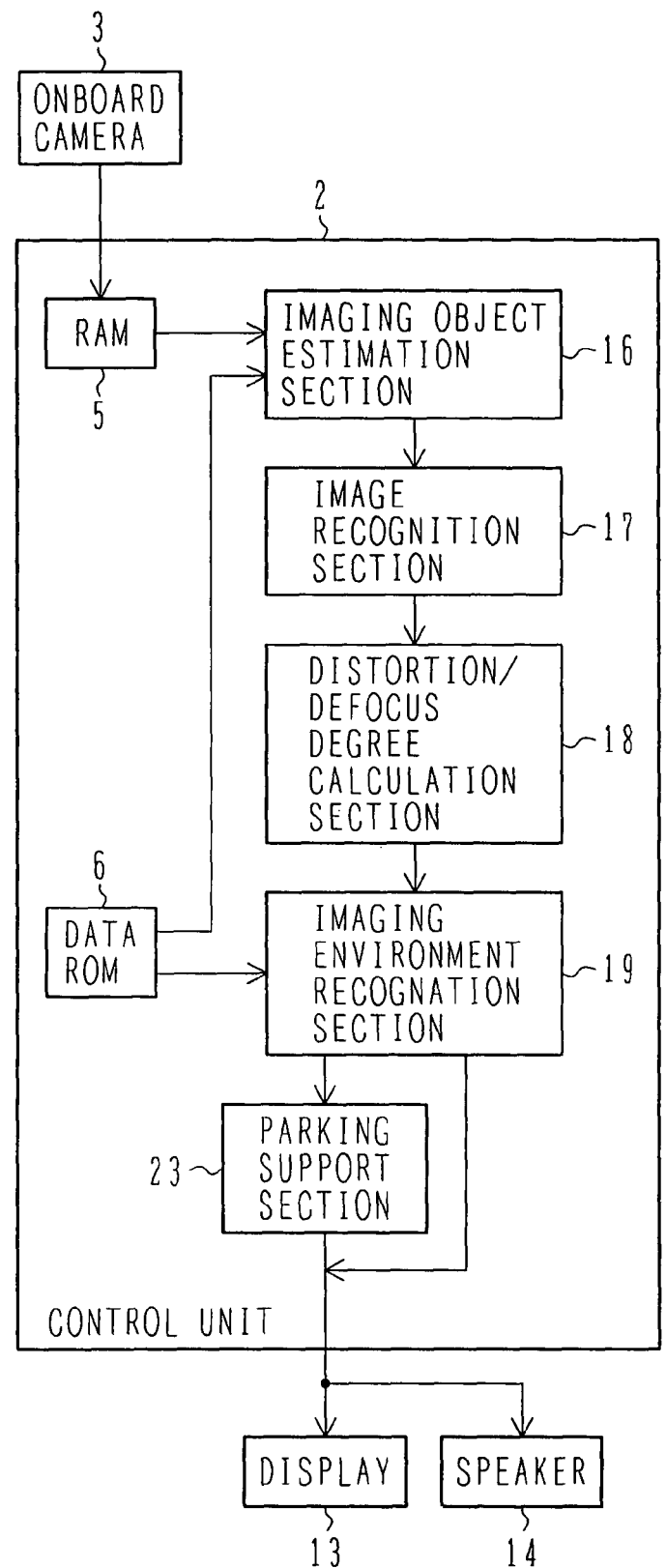
FIG. 10 is a functional block diagram of a control unit achieved when an imaging environment recognition program and a parking support program are executed in the onboard system according to the second embodiment of the present invention.

An ignition signal from an ignition switch 8 is supplied to the control unit 2. The ignition signal is turned on when an engine of the host vehicle is started. When the ignition signal from the ignition switch 8 is turned on, the CPU 6 of the control unit 2 executes the imaging environment recognition program. The control unit 2 then functions as an imaging object estimation section 16, an image recognition section 17, a distortion/defocus degree calculation section 18, and an imaging environment recognition section 19 as shown in a block diagram of FIG. 10. Further, the parking support program is executed by the reverse on signal supplied by the reverse switch 22, which allows a parking support section 23 to function.

The imaging object estimation section 16 reads a position at which the rear bumper of the host vehicle is imaged, the position having been previously stored in a data ROM 7 at the factory. The imaging object estimation section 16 thereby acquires a boundary on the image between the bumper and a road surface existing within the field of view of the onboard camera 3. The image recognition section 17 recognizes, from the image taken by the onboard camera 3, a bumper area in the field of view of the onboard camera 3. The distortion/defocus degree calculation section 18 calculates the degree of defocus of a boundary line relative to the road surface, from an area in which the rear bumper is to be imaged, as obtained from the boundary between the bumper and the road surface acquired by the imaging object estimation section 16, and a bumper area recognized by the image recognition section 17. The imaging environment recognition section 19 recognizes the imaging environment from the degree of distortion and defocus obtained by the distortion/defocus degree calculation section 18.

The onboard system including the elements as described above normally displays the traveling path guidance image on the display 13 through the navigation program executed by the CPU 6 of the control unit 2. The CPU 6 of the control unit 2 concurrently executes the imaging environment recognition program. If water droplets or the like on the lens are detected through the imaging environment recognition program, a message informing a fact to that effect is superimposed on guidance image displayed on the display 13. In addition, when the reverse on signal outputted from the reverse switch 22 during the reverse of the vehicle is supplied to the control unit 2, the CPU 6 executes the parking support program, causing the rearward image and the parking support program image to be superimposed on the display 13.

In the onboard system to which the present invention is applied, the CPU 6 of the control unit 2 executes the imaging environment recognition program when the ignition switch 8 is turned on, thereby determining at regular intervals a specific environment, in which the image is taken. If the imaging environment, in which fog occurs or water droplets or dirt are deposited on the lens, is detected, parameters for the parking support program are changed so that a parking space marker line or an obstacle rearward of the host vehicle can be properly detected under the imaging environment recognized. If it is determined that it is impossible to provide parking support, the system is shut down to prevent the system from operating erroneously. A message to that effect is then displayed on the display 13, while an alarm sound is produced from the speaker 14 to warn the occupant of the vehicle.

Figure 11:
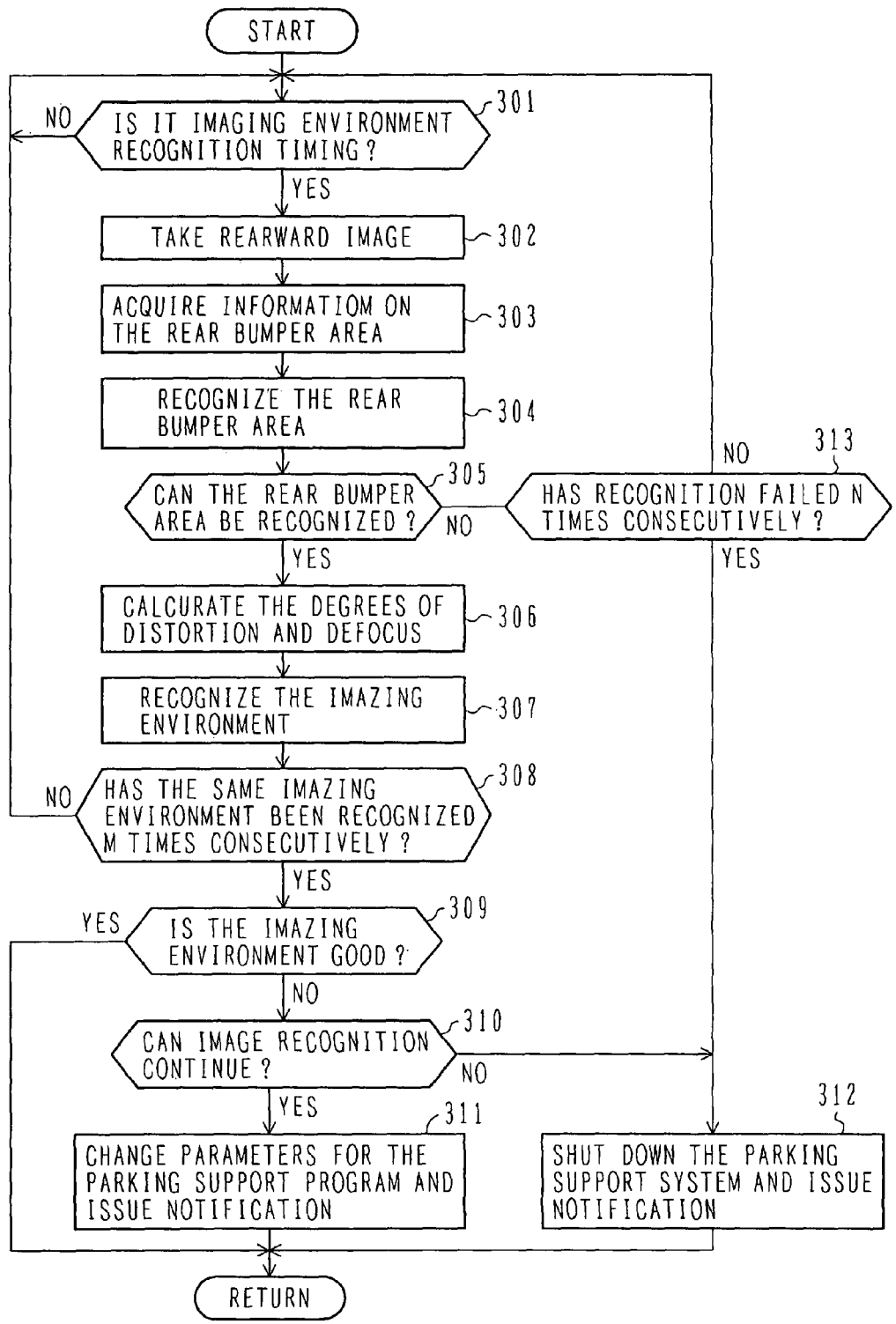
FIG. 11 is a flowchart showing operations performed by an imaging environment recognition section in the onboard system according to the second embodiment of the present invention.

Flow of a series of processing steps performed by the control unit 2 for recognizing the imaging environment of the onboard camera 3 in the onboard system as described heretofore will be described with reference to a flowchart shown in FIG. 11. The series of processing steps shown in FIG. 11 is executed by the imaging environment recognition program that is started when the ignition switch 8 is turned on and repeatedly started until the ignition switch 8 is turned off. The series of processing steps is executed regardless of whether the host vehicle is running or stationary, and whether the image displayed on the display 13 is the traveling path guidance image or one shown by the parking support system.

When the ignition signal is turned on, the control unit 2 executes the imaging environment recognition program. It is then determined whether it is previously determined imaging environment recognition timing or not (step 301). Alternatively, presence of a feature is detected rearward of the host vehicle and the system establishes the imaging environment recognition timing when the feature overlaps the rear bumper.

When the imaging environment recognition timing arrives, an actual image rearward of the host vehicle is taken by the onboard camera 3 and is captured and retained in the RAM 5 (step 302).

The imaging object estimation section 16 next acquires information on the rear bumper area on the image stored in the data ROM 7 (step 303). The data ROM 7 stores the information on the factory-detected bumper area that represents the specific position occupied by the rear bumper in the image taken by the onboard camera 3. The image recognition section 17 detects the rear bumper area as follows. Specifically, for all pixels that make up the actual image retained in the RAM 5, the image recognition section 17 identifies specific pixels, in which a difference in pixel value from adjacent pixels exceeds a predetermined value. That is, the image recognition section 17 identifies specific positions, at which brightness changes largely in the actual image. These positions form a boundary portion between the bumper and the road surface, detected as the rear bumper area (step 304).

It is determined if the rear bumper area has successfully been detected (step 305). If the rear bumper area has successfully been detected, the distortion/defocus degree calculation section 18 calculates distortion and the degree of defocus based on a rear bumper width detected by the image recognition section 17 and a rear bumper width estimated by the imaging object estimation section 16. More specifically, referring to FIG. 12, the rear bumper width estimated by the imaging object estimation section 16 is compared with the rear bumper width calculated from the image taken by the onboard camera 3. Referring to FIG. 12, assuming that the rear bumper width estimated by the imaging object estimation section 16 is Wa and the rear bumper width detected from the image taken is Wb, Wb/Wa is calculated. The Wb/Wa value is calculated for a plurality of processing areas. A mean value of the plurality of Wb/Wa values is defined as a degree of defocus and variance of the Wb/Wa values is defined as a degree of distortion (step 306).

The imaging environment recognition section 19 identifies fog, rain, water droplets on the lens, or fog of the lens from the degree of defocus and the degree of distortion (step 307). Referring to FIG. 13, if, for example, the water droplets are deposited generally over the entire surface of the lens, the mean value of the degree of defocus is large in all areas of the image, with a large variance of the degree of defocus. If the water droplets are deposited only locally on the surface of the lens, the mean value and variance of the degree of defocus fall on substantially intermediate values between a value obtained when the imaging environment is good and a value obtained when the water droplets spread generally all over the surface of the lens.

Only if the imaging environment recognized in step 307 is the same a predetermined number of times or more, it is determined that the imaging environment has been recognized and the operation proceeds to step 309. Otherwise, the operation returns to step 301 again (step 308).

If the image recognition section 17 is unable to recognize the bumper area estimated by the imaging object estimation section 16 in step 305, it is determined whether or not the image recognition section 17 has failed to recognize the bumper area a predetermined number of times consecutively (step 313). If it is determined that the image recognition section 17 has failed to recognize the bumper area the predetermined number of times consecutively, the imaging environment recognition section 19 determines that it is difficult to correctly recognize an image under the current imaging environment, and the operation proceeds to step 312. Otherwise, the operation returns to step 301.

If visibility is found to be good as a result of the recognition of the imaging environment performed in step 307, it is determined that the imaging environment is good because of no problems existing in the imaging environment. If visibility is found to be poor, the operation proceeds to a subsequent step (step 309).

If the imaging environment recognition section 19 determines in step 307, for example, that water droplets are on the lens of the onboard camera 3, it is determined whether or not image recognition can continue by determining whether or not the distortion and the degree of defocus fall within a predetermined threshold value (step 310). If it is determined that the distortion and the degree of defocus are smaller than the predetermined threshold value and the image recognition can continue, the result of imaging environment recognition performed in step 307 is transmitted to the parking support section 23, so that various parameters of the parking support program are changed to values corresponding to the case where water droplets are deposited on the lens. At the same time, the control unit 2 lets the display 13 show a message to that effect (step 311). If it is determined that the distortion and the degree of defocus are greater than the predetermined threshold value and the image recognition cannot continue, the control unit 2 drives the speaker 14 to produce the alarm sound. The occupant of the vehicle is thereby notified that the imaging environment for the onboard camera 3 is not good and the parking support system operates erroneously. The parking support program is then temporarily halted (step 312). The occupant of the vehicle can recognize, through this notification, that the parking support system may not be fully operational and take appropriate action including, for example, intentionally turning off the parking support system.

The onboard system, to which the present invention is applied, lets the control unit 2 perform repeatedly the series of operations as described above until the ignition switch 8 is turned off. It is thereby periodically determined whether or not the imaging environment for the onboard camera 3 is good.

As described heretofore, the onboard system, to which the present invention is applied, recognizes the imaging environment for the onboard camera 3 at regular intervals and transmits the result of recognition to the various systems using the onboard camera 3. The onboard system further notifies the occupant of the vehicle of the recognition result, so that the various systems using the onboard camera 3 change system operations or the like in accordance with the result of recognition of the imaging environment. In addition, the occupant can improve the imaging environment by removing water droplets or dirt from the surface of the lens of the onboard camera 3, thereby allowing the systems to operate appropriately. If it is determined that it is difficult for the systems using the onboard camera 3 to continue operation, the systems are shut down. Or, the occupant of the vehicle shuts down the systems based on the information given by the control unit 2, so that the systems using the onboard camera 3 can be prevented from operating erroneously.

What is claimed is:

1. An imaging environment recognition device having an imaging means for imaging an area surrounding a vehicle and an image recognition section for recognizing an object and a texture existing within a field of view of the imaging means by processing an image captured by the imaging means, wherein the texture is at least one of a texture of an object or a texture of an outline of an object, the imaging environment recognition device comprising:

a storage means for storing shape information of an object of interest;

a distortion/defocus degree calculation section for calculating degrees of distortion and defocus of the object of interest and the texture in a captured image, based on shapes of the object of interest and the texture in the captured image and the shape information of the object of interest stored in said storage means; and an imaging environment recognition section for recognizing imaging environment based on the degrees of distortion and defocus calculated.

2. The imaging environment recognition device according to claim 1, further comprising:

an imaging object estimation section for finding an object and texture existing within the field of view of the imaging means, wherein an object and texture estimated by said imaging object estimation section are subject to recognition by said image recognition section to recognize the object and the texture existing within the field of view of the imaging means.

3. The imaging environment recognition device according to claim 2, further comprising:

a positioning means for finding a current position and a traveling direction of the vehicle; and a map database for storing at least types and positions of road markings, wherein said shape information includes characteristics information including at least dimensional information corresponding to the types of the road markings; and wherein said imaging object estimation section finds a road marking existing within the field of view of the imaging means from the map database as an object or texture existing within the field of view of the imaging means, based on the current position and the traveling direction of the vehicle found by said positioning means.

4. The imaging environment recognition device according to claim 2, wherein the imaging means is disposed at a position, at which part of a body of the vehicle falls within the field of view thereof;

said storage means previously stores information on positions, at which the part of the vehicle body is to be observed; said imaging object estimation section finds the part of the vehicle body as an object or texture existing within the field of view of the imaging means; and wherein said image recognition section recognizes the part of the vehicle body based on the information on positions at which the part of the vehicle body is to be observed, the information on positions being stored in the storage means.

5. The imaging environment recognition device according to claim 4, wherein a rear bumper is used as the part of the vehicle body.

6. The imaging environment recognition device according to claim 4, wherein said imaging environment recognition section uses said image recognition section to detect the part of the vehicle body when the imaging environment recognition device is started, compares the part of the vehicle body detected by said image recognition section with the information on positions at which the part of the vehicle body is to be observed, the information on position being stored in the storage means, and, if deviation in positions between the two falls within a predetermined range, stores an area corresponding to the part of the vehicle body detected upon starting of the device as information on positions at which the part of the vehicle body is to be observed.

7. The imaging environment recognition device according to claim 2,
wherein said imaging environment recognition section terminates processing using the image captured by the imaging means if said image recognition section fails to recognize the object or the texture existing within the field of view of the imaging means a predetermined number of times or more consecutively, the object or the texture being estimated by said imaging object estimation section.

8. The imaging environment recognition device according to claim 1,
wherein a system using the image captured by the imaging means is shut down if the degrees of distortion and defocus calculated by said distortion/defocus degree calculation section are equal to or more than a predetermined value.

9. A method for recognizing imaging environment, the method using a camera for taking an image surrounding a vehicle and recognizing an object and a texture existing within a field of view of the camera, wherein the texture is at least one of a texture of an object or a texture of an outline of an object, the method comprising the steps of:
calculating degrees of distortion and defocus of the object and the texture in the image taken by the camera, based on shapes of the object and the texture on the image taken by the camera and shape information of objects to be recognized stored previously; and
recognizing the imaging environment based on the degrees of distortion and defocus calculated.

10. The method according to claim 9, further comprising the step of:
estimating an object and texture existing within a field of view of the camera,
wherein the estimated object and texture exiting within the field of view of the camera are subject to recognition of an object and texture existing within the field of view of the camera.

11. The method according to claim 10, further comprising the steps of:
finding a current position and a traveling direction of the vehicle, wherein the shape information includes characteristics information including at least dimensional information corresponding to types of road markings; and
estimating, from a map database storing at least types and positions of road markings, a road marking existing within the field of view of the camera as an object or texture existing within the field of view of the camera based on the current position and the traveling direction found.

* * * * *